United States Patent
Fukuhara et al.

(10) Patent No.: US 11,414,507 B2
(45) Date of Patent: Aug. 16, 2022

(54) MODIFIED VINYL ALCOHOL POLYMER, METHOD FOR PRODUCING SAME, DISPERSION STABILIZER FOR SUSPENSION POLYMERIZATION, AND METHOD FOR PRODUCING VINYL POLYMER

(71) Applicant: KURARAY CO., LTD., Kurashiki (JP)

(72) Inventors: Tadahito Fukuhara, Ibaraki (JP); Yoko Nakano, Okayama (JP); Masato Nakamae, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 17/256,843

(22) PCT Filed: Jul. 4, 2019

(86) PCT No.: PCT/JP2019/026597
§ 371 (c)(1),
(2) Date: Dec. 29, 2020

(87) PCT Pub. No.: WO2020/009178
PCT Pub. Date: Jan. 9, 2020

(65) Prior Publication Data
US 2021/0261704 A1    Aug. 26, 2021

(30) Foreign Application Priority Data

Jul. 5, 2018 (JP) .............................. JP2018-128601

(51) Int. Cl.
*C08F 216/06* (2006.01)
(52) U.S. Cl.
CPC .................................. *C08F 216/06* (2013.01)
(58) Field of Classification Search
CPC .................................. C08F 216/06; C08F 8/14
See application file for complete search history.

(56) References Cited

U.S. PATENT DOCUMENTS

| 4,540,743 A | 9/1985 | Schulz et al. |
| 2009/0111940 A1 | 4/2009 | Kato et al. |
| 2009/0247698 A1 | 10/2009 | Nitta |
| 2017/0198068 A1 | 7/2017 | Kozuka et al. |
| 2019/0338115 A1* | 11/2019 | Fukuhara .............. C08F 216/06 |
| 2020/0247915 A1 | 8/2020 | Fukuhara et al. |

FOREIGN PATENT DOCUMENTS

| EP | 3 564 271 A1 | 11/2019 |
| EP | 3 778 683 A1 | 2/2021 |
| JP | 60-13803 A | 1/1985 |
| JP | 9-77807 A | 3/1997 |
| JP | 2000-239317 A | 9/2000 |
| WO | WO 2007/023762 A1 | 3/2007 |
| WO | WO 2007/119735 A1 | 10/2007 |
| WO | WO 2015/182567 A1 | 12/2015 |
| WO | WO 2018124241 * | 7/2018 |
| WO | WO 2019/031461 A1 | 2/2019 |
| WO | WO 2019/198764 A1 | 10/2019 |
| WO | WO 2019/244967 A1 | 12/2019 |

OTHER PUBLICATIONS

International Search Report dated Oct. 1, 2019 in PCT/JP2019/026597 filed on Jul. 4, 2019, 2 pages.
Extended European Search Report dated Mar. 2, 2022 in European Patent Application No. 19831478.3, 13 pages.

* cited by examiner

*Primary Examiner* — Jeffrey C Mullis
(74) *Attorney, Agent, or Firm* — Oblon, McClelland, Maier & Neustadt, L.L.P.

(57) ABSTRACT

The present invention provides a modified vinyl alcohol polymer having a side chain with an ethylenic double bond, and having reduced a water-insoluble content and superior storage stability in the form of an aqueous solution, methods of making thereof, a modified vinyl alcohol polymer (A) having a degree of saponification of 68 mol % or more and less than 99.9 mol %, and a viscosity-average degree of polymerization of 200 or more and less than 3,000, and comprising a side chain with 0.01 mol % or more and less than 0.50 mol % of a double bond derived from an esterification agent, the esterification agent being one or more selected from the group consisting of (i) itaconic acid and/or derivatives thereof, and (ii) methacrylic acid and/or derivatives thereof, and the modified vinyl alcohol polymer (A) having a peak width $W_{0.05h}$ of at least 2.85 minutes and less than 3.70 minutes at a height of 5% from the baseline in a peak measured by HPLC.

7 Claims, No Drawings

MODIFIED VINYL ALCOHOL POLYMER, METHOD FOR PRODUCING SAME, DISPERSION STABILIZER FOR SUSPENSION POLYMERIZATION, AND METHOD FOR PRODUCING VINYL POLYMER

TECHNICAL FIELD

The present invention relates to a modified vinyl alcohol polymer having a degree of saponification and a viscosity-average degree of polymerization within specific ranges, and having a specific modifying group in the side chain, and a specific peak width as measured by high-performance liquid chromatography, and to a method for producing such a modified vinyl alcohol polymer. The present invention also relates to a dispersion stabilizer for suspension polymerization of vinyl compounds using the modified vinyl alcohol polymer, and to a method for producing a vinyl polymer.

BACKGROUND ART

Polyvinyl alcohol (hereinafter, also referred to as "PVA" for short) has been used for a wide range of products and applications, including dispersion stabilizers for suspension polymerization of vinyl compounds, coating agents, adhesives, polarizing films, water-soluble films, drugs, and cosmetics. It is known that the presence of reactive groups, such as ethylenic double bonds, in PVA improves various qualities of PVA, or produces special effects.

However, because of high reactivity, ethylenic double bonds in PVA may cause gelation by undergoing reaction during production or long storage of PVA having ethylenic double bonds. When such PVA is used in the form of an aqueous solution, the gel may cause clogging of pipes or other parts of production facilities, and lead to reduced productivity. Water-insoluble content, such as gels, also cause defects in film applications, and there exists a need for reducing a water-insoluble content.

Use of PVA as a dispersion stabilizer for suspension polymerization of vinyl compounds is an area where storage stability of PVA and reduction of a water-insoluble content are needed. There are reports that a polymerization reaction of a vinyl compound stabilizes when a PVA having an ethylenic double bond is used as a dispersion stabilizer for suspension polymerization of vinyl compounds (Patent Literatures 1 and 2).

Patent Literature 1 describes a dispersion stabilizer for suspension polymerization containing a polyvinyl alcohol polymer having a side chain with a double bond, and that is obtained by acetalization of a polyvinyl alcohol polymer with a monoaldehyde having an olefinic unsaturated double bond.

Patent Literature 2 describes a dispersion stabilizer comprising a polyvinyl alcohol polymer having a side chain with a double bond, and that is obtained by esterification of a polyvinyl alcohol polymer with a carboxylic acid having an unsaturated double bond or with a salt thereof.

However, these dispersion stabilizers are not effective enough in terms of polymerization stability when used for suspension polymerization of vinyl compounds. The dispersion stabilizers of the foregoing related art documents are also not sufficient in terms of storage stability, and involve large amounts of a water-insoluble content. In this specification, "polymerization stability" means a property that enables production of vinyl polymer particles of a uniform diameter by inhibiting coarsening of particles by way of improved dispersibility of liquid droplets of a vinyl compound during suspension polymerization.

CITATION LIST

Patent Literature

Patent Literature 1: WO 2015/182567 A1
Patent Literature 2: WO 2007/119735 A1

SUMMARY OF INVENTION

Technical Problem

An object of the present invention is to provide a modified vinyl alcohol polymer having reduced a water-insoluble content immediately after production and even after long storage. Another object of the present invention is to provide a modified vinyl alcohol polymer that, when used as a dispersion stabilizer for suspension polymerization of vinyl compounds, provides superior polymerization stability that enables production of a vinyl polymer having high bulk specific gravity and superior plasticizer absorbability with little formation of coarse particles, and reduction of fisheyes in a molded product made from the vinyl polymer.

Solution to Problem

The present inventors conducted intensive studies to find a solution to the foregoing problems, and found that the foregoing problems can be solved with a modified vinyl alcohol polymer having a degree of saponification and a viscosity-average degree of polymerization within specific ranges, and having a side chain with a specific functional group, and a specific range of peak widths as measured by high-performance liquid chromatography. The present invention was completed on the basis of this finding.

Specifically, the present invention relates to the following.
[1] A modified vinyl alcohol polymer (A) having a degree of saponification of 68 mol % or more and less than 99.9 mol %, and a viscosity-average degree of polymerization of 200 or more and less than 3,000, and comprising a side chain with 0.01 mol % or more and less than 0.50 mol % of a double bond derived from an esterification agent, the esterification agent being one or more selected from the group consisting of (i) itaconic acid and/or derivatives thereof, and (ii) methacrylic acid and/or derivatives thereof, and the modified vinyl alcohol polymer (A) having a peak width $W_{0.05h}$ of at least 2.85 minutes and less than 3.70 minutes at a height of 5% from the baseline in a peak measured by high-performance liquid chromatography.
[2] A method for producing the modified vinyl alcohol polymer (A) of [1], comprising a heat-treatment and modification step of modifying a vinyl alcohol polymer (B) having a degree of saponification of 68 mol % or more and less than 99.9 mol % and a viscosity-average degree of polymerization of 200 or more and less than 3,000 in a heat treatment in the presence of a solvent and an esterification agent, wherein the solvent is one or more selected from the group consisting of acetone, methanol, and methyl acetate, and the esterification agent is one or more selected from the group consisting of (i) itaconic acid and/or derivatives thereof, and (ii) methacrylic acid and/or derivatives thereof.
[3] The method according to [2], wherein the solvent is one or more selected from the group consisting of methanol and methyl acetate.

[4] The method according to [2], wherein the solvent is methanol and methyl acetate.

[5] The method according to any one of [2] to [4], wherein the solvent is used in an amount of 1 part by mass or more and less than 100 parts by mass relative to 100 parts by mass of the vinyl alcohol polymer (B).

[6] A dispersion stabilizer for suspension polymerization of vinyl compounds, comprising the modified vinyl alcohol polymer (A) of [1].

[7] A method for producing a vinyl polymer, comprising subjecting a vinyl compound to suspension polymerization in the presence of the dispersion stabilizer for suspension polymerization of [6].

Advantageous Effects of Invention

A modified vinyl alcohol polymer (A) of the present invention has reduced a water-insoluble content immediately after production and after long storage. When used as a dispersion stabilizer for suspension polymerization of vinyl compounds, a modified vinyl alcohol polymer (A) of the present invention provides superior polymerization stability that enables production of a vinyl polymer having high bulk specific gravity and superior plasticizer absorbability with little formation of coarse particles, and reduction of fisheyes in a molded product made from the vinyl polymer.

DESCRIPTION OF EMBODIMENTS

Modified Vinyl Alcohol Polymer (A)

A modified vinyl alcohol polymer (A) of the present invention (hereinafter, also referred to as "modified PVA (A)" for short) has a degree of saponification of 68 mol % or more and less than 99.9 mol %, and a viscosity-average degree of polymerization of 200 or more and less than 3,000, and comprises a side chain with 0.01 mol % or more and less than 0.50 mol % of a double bond derived from an esterification agent, the esterification agent being one or more selected from the group consisting of (i) itaconic acid and/or derivatives thereof, and (ii) methacrylic acid and/or derivatives thereof, and the modified vinyl alcohol polymer (A) having a peak width $W_{0.05h}$ of at least 2.85 minutes and less than 3.70 minutes at a height of 5% from the baseline in a peak measured by high-performance liquid chromatography (hereinafter, also referred to as "HPLC" for short).

It is important that the modified PVA(A) have a viscosity-average degree of polymerization of 200 or more and less than 3,000. Preferably, the modified PVA(A) has a viscosity-average degree of polymerization of 300 or more and less than 2,500. A viscosity-average degree of polymerization of less than 200 results in reduced productivity, and the water-insoluble content of modified PVA(A) increases. A viscosity-average degree of polymerization of less than 200 also results in reduced polymerization stability when the modified PVA(A) is used as a dispersion stabilizer for suspension polymerization of vinyl compounds, and increases the number of coarse particles in the vinyl polymer obtained. A viscosity-average degree of polymerization of 3,000 or more increases the water-insoluble content of modified PVA(A), and increases fisheyes in a molded product of a vinyl polymer obtained when modified PVA(A) is used as a dispersion stabilizer for suspension polymerization of vinyl compounds.

The viscosity-average degree of polymerization of modified PVA(A) is a measured value according to JIS K 6726: 1994. Specifically, in the case of a modified PVA(A) having a degree of saponification of less than 99.5 mol %, the modified PVA(A) is saponified until the degree of saponification reaches at least 99.5 mol %, and the viscosity-average degree of polymerization (P) is determined from the limiting viscosity [η] (L/g) measured in water at 30° C., using the following formula.

$$P=([\eta]\times10^4/8.29)^{(1/0.62)}$$

It is important that the degree of saponification of modified PVA(A) be 68 mol % or more and less than 99.9 mol %. Preferably, the degree of saponification of modified PVA(A) is more than 70 mol % and less than 99.7 mol %. With a degree of saponification of less than 68 mol %, the water solubility of modified PVA(A) decreases, and the water-insoluble content increases. A degree of saponification of less than 68 mol % also results in reduced polymerization stability when the modified PVA(A) is used as a dispersion stabilizer for suspension polymerization of vinyl compounds, and increases the number of coarse particles in the vinyl polymer obtained. With a degree of saponification of 99.9 mol % or more, the water-insoluble content of modified PVA(A) increases, and the polymerization stability decreases when the modified PVA(A) is used as a dispersion stabilizer for suspension polymerization of vinyl compounds. A degree of saponification of 99.9 mol % or more also increases the number of coarse particles in the vinyl polymer obtained, and increases fisheyes in a molded product of the vinyl polymer. The degree of saponification is a measured value according to JIS K 6726:1994.

The modified PVA(A) has a side chain with an ethylenic double bond derived from a predetermined esterification agent (hereinafter, such an ethylenic double bond on a side chain will be referred to also as "a modifying group in the side chain"), and, by its reactivity, exhibits unique performance in a wide variety of applications. For example, the modified PVA(A) is useful in adhesive and film applications by taking advantage of the crosslinking reaction due to the ethylenic double bond, and in dispersant applications by taking advantage of the high adsorbability for hydrophobic compounds. Particularly, the modified PVA(A) has high adsorbability for vinyl compounds, and provides superior polymerization stability when used as a dispersion stabilizer for suspension polymerization of vinyl compounds. The vinyl polymer obtained by using the modified PVA(A) has high bulk specific gravity and superior plasticizer absorbability with little formation of coarse particles, and a molded product of the vinyl polymer can have reduced numbers of fisheyes. It is important that the content of a modifying group(s) in the side chain be 0.01 mol % or more and less than 0.50 mol % relative to all monomer units. The content of the modifying group(s) in the side chain is preferably 0.03 mol % or more and 0.45 mol % or less, more preferably 0.08 mol % or more and 0.40 mol % or less. When the content of the modifying group(s) in the side chain is less than 0.01 mol %, the effect produced by the modifying group becomes smaller, and the polymerization stability decreases, particularly when the modified PVA(A) is used as a dispersion stabilizer for suspension polymerization of vinyl compounds. This increases the number of coarse particles in the vinyl polymer obtained. When the content of the modifying group(s) in the side chain is 0.50 mol % or more, the water-insoluble content of modified PVA(A) increases, and the modified PVA(A) fails to provide sufficient polymerization stability when used as a dispersion stabilizer for suspension polymerization of vinyl compounds, and increases fisheyes in a molded product of the vinyl polymer.

The modified PVA(A) may have a side chain with other modifying group(s) in the side chain, provided that the effects of the present invention are obtained. The content of such other modifying group(s) is preferably less than 5 mol %, more preferably less than 1 mol %, even more preferably less than 0.1 mol %, particularly preferably less than 0.01 mol % relative to all monomer units.

It is important that the modified PVA(A) have a $W_{0.05h}$ value of at least 2.85 minutes and less than 3.70 minutes, where $W_{0.05h}$ is the peak width at a height of 5% from the baseline in a peak measured by HPLC. The peak width $W_{0.05h}$ is preferably at least 2.90 minutes and less than 3.60 minutes, more preferably at least 2.95 minutes and less than 3.50 minutes, even more preferably at least 2.99 minutes and less than 3.40 minutes. The peak width $W_{0.05h}$ indicates the modification unevenness of the modifying group(s) in the side chain of modified PVA(A), and larger values of $W_{0.05h}$ indicate greater modification unevenness. In this specification, "modification unevenness" means unevenness in the amount of the modifying group(s) in the side chain introduced to every chain of modified PVA(A), and the modification unevenness is smaller when the modifying group(s) in the side chain is more evenly introduced to every chain of modified PVA(A). In other words, the modification unevenness is small when the amount of the modifying group(s) in the side chain is the same degree or about the same degree in any chain of modified PVA(A). With the foregoing ranges of peak widths $W_{0.05h}$, the modified PVA(A) can have reduced amounts of water-insoluble immediately after production and after long storage, and, particularly, improved adsorbability for vinyl compounds. This, with the synergy created by the ethylenic double bonds on side chains, further improves the polymerization stability of when the modified PVA(A) is used as a dispersion stabilizer for suspension polymerization of vinyl compounds. With foregoing ranges of peak widths $W_{0.05h}$, the vinyl polymer obtained can have high bulk specific gravity and superior plasticizer absorbability. A $W_{0.05h}$ value of less than 2.85 minutes means that the modification unevenness is very small. For example, in producing a modified PVA(A) through esterification of a raw material vinyl alcohol polymer (B) (hereinafter, also referred to as "PVA(B)" for short) using a specific unsaturated carboxylic acid and/or a derivative thereof (itaconic acid and/or a derivative thereof, or methacrylic acid and/or a derivative thereof) as an esterification agent in the manner described below, the PVA(B) used for production needs to be reacted in the form of a solution to minimize modification unevenness (i.e., the reaction needs to be carried out in a homogenous system), necessitating esterification by dissolving PVA(B) using a solvent, such as DMSO, capable of dissolving PVA(B). However, because such solvents have high boiling points, the subsequent removal and collection of solvent makes the process highly unproductive and uneconomical in industrial production, and adds difficulty to production. An excessively small modification unevenness tends to cause formation of a PVA chain assembly as a result of an increased fraction of PVA chains of the same structure with the same degree of modification. This increases the water-insoluble content in the modified PVA(A). A $W_{0.05h}$ value of 3.70 minutes or more indicates large modification unevenness, meaning that esterification has taken place in a localized fashion. This increases the water-insoluble content of modified PVA(A), and decreases the polymerization stability of the vinyl compound of when the modified PVA(A) is used as a dispersion stabilizer for suspension polymerization of vinyl compounds. The resulting vinyl polymer has increased numbers of coarse particles with decreased bulk specific gravity and decreased plasticizer absorbability, and a molded product of the vinyl polymer has increased numbers of fisheyes.

$W_{0.05h}$ is defined by the value used for calculations of symmetry coefficient in JIS K 0124:2011. $W_{0.05h}$ represents the peak width at 1/20 of the height from the baseline in a peak measured by HPLC.

The specific conditions for the measurement of $W_{0.05h}$ of modified PVA(A) in the present invention are as follows.
Specimen concentration: 5 mg/mL
Specimen solvent: water
Injection volume: 30 µL
Detector: evaporative light scattering detector ELSD-LTII (manufactured by Shimadzu Corporation)
Column temperature: 45° C.
Mobile phase A: ion-exchange water; B: ethanol (99.5%)
Flow rate of mobile phase: 0.4 mL/min
Column: Shimpack G-ODS(4), 4 mm in inner diameter×1 cm in length, particle diameter: 5 µm, manufactured by Shimadzu Corporation
Gradient Conditions:

In a HPLC system using ion-exchange water and ethanol as mobile phase A and mobile phase B, respectively, the column before injection of specimen solution is filled with a 95:5 mixed solvent of mobile phase A and mobile phase B by volume. The specimen solution is injected under this condition. A 95:5 mixture of mobile phase A and mobile phase B by volume is passed for 5 minutes immediately after the injection of specimen solution, and the proportion of mobile phase B in the mobile phase is increased at a constant rate over the period of next 20 minutes so as to make the proportion of mobile phase B 100% after 25 minutes from the injection of the specimen solution.

Method of Production of Modified PVA(A)

A modified PVA(A) of the present invention can be produced by, for example, a method that comprises a heat-treatment and modification step of modifying a commercially available PVA(B) having the predetermined degree of saponification and the predetermined viscosity-average degree of polymerization in a heat treatment in the presence of a solvent and an esterification agent, wherein the solvent is one or more selected from the group consisting of acetone, methanol, and methyl acetate, and the esterification agent is one or more selected from the group consisting of (i) itaconic acid and/or derivatives thereof, and (ii) methacrylic acid and/or derivatives thereof. The raw material PVA(B) can be produced by, for example, a method that comprises polymerizing a vinyl ester monomer to obtain a vinyl ester polymer, and saponifying the vinyl ester polymer to obtain a PVA.

Polymerization may be carried out using a known polymerization method, for example, such as bulk polymerization, solution polymerization, suspension polymerization, emulsion polymerization, or dispersion polymerization. Preferred from an industrial viewpoint are solution polymerization, emulsion polymerization, and dispersion polymerization. The polymerization may follow the batch, semi-batch, or continuous procedure.

Examples of the vinyl ester monomer include vinyl acetate, vinyl formate, vinyl propionate, vinyl caprylate, and vinyl versatate. Preferred from an industrial viewpoint is vinyl acetate.

In the polymerization step, monomers other than the vinyl ester monomer may be copolymerized, provided that it is not against the intent and purpose of the present invention. By copolymerizing other monomers with the vinyl ester monomer, the resulting polymer can have a structure of other monomer units in its main chain. Examples of such other monomers include:

α-olefins such as ethylene and propylene;

(meth)acrylic acids and salts thereof;

(meth)acrylic acid esters such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate, and octadecyl (meth)acrylate;

(meth)acrylamides;

derivatives of (meth)acrylamides, such as N-methyl (meth)acrylamide, N-ethyl(meth)acrylamide, N,N-dimethyl (meth)acrylamide, diacetone(meth)acrylamide, (meth)acrylamidepropanesulfonic acid and salts thereof, (meth)acrylamidepropyldimethylamine and salts thereof or quaternary salts thereof, and N-methylol(meth)acrylamide and derivatives thereof, vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether;

nitriles such as acrylonitrile and methacrylonitrile;

vinyl halides such as vinyl chloride and vinyl fluoride;

vinylidene halides such as vinylidene chloride and vinylidene fluoride;

allyl compounds such as allyl acetate and allyl chloride;

unsaturated dicarboxylic acids such as maleic acid, itaconic acid, and fumaric acid, and salts or esters thereof, vinyl silyl compounds such as vinyltrimethoxysilane; and isopropenyl acetate.

When copolymerizing these monomers, the content of other monomers is typically 5 mol % or less. As used herein, "(meth)acryl" is a collective term for "methacryl" and "acryl".

The solvent used in the polymerization step is preferably an alcohol solvent. Examples of the alcohol solvent include methanol, ethanol, and propanol. Preferred is methanol. These may be used alone, or two or more thereof may be used in combination.

The polymerization initiator used in the polymerization step is not particularly limited, and may be selected from known polymerization initiators according to the polymerization method. Examples of the polymerization initiator include azo polymerization initiators, peroxide polymerization initiators, and redox polymerization initiators. Examples of the azo polymerization initiators include 2,2'-azobis(2,4-dimethylvaleronitrile), 2,2'-azobis(isobutyronitrile), and 2,2'-azobis(4-methoxy-2,4-dimethylvaleronitrile). Examples of the peroxide polymerization initiators include peroxydicarbonate compounds such as diisopropyl peroxydicarbonate, di(2-ethylhexyl)peroxydicarbonate, and diethoxyethyl peroxydicarbonate; perester compounds such as t-butyl peroxyneodecanoate, and cumyl peroxyneodecanoate; acetyl(cyclohexylsulfonyl)peroxide; and 2,4,4-trimethylpentyl-2-peroxyphenoxyacetate. Examples of the redox polymerization initiators include combinations of oxidizing agents and reducing agents. The oxidizing agents are preferably peroxides. Examples of the reducing agents include metal ions, and reducing compounds. Examples of the combinations of oxidizing agents and reducing agents include combinations of peroxides and metal ions; combinations of peroxides and reducing compounds; and combinations of peroxides, metal ions, and reducing compounds. Examples of the peroxides include hydrogen peroxide, and hydroperoxides such as cumene hydroperoxide and t-butyl hydroperoxide, persulfates (potassium, sodium, or ammonium salts), t-butyl peroxyacetate, and peracid esters (t-butyl peroxybenzoate). Examples of the metal ions include metal ions capable of accepting a single electron, such as $Fe^{2+}$, $Cr^{2+}$, $V^{2+}$, $Co^{2+}$, $Ti^{3+}$, and Cut Examples of the reducing compounds include sodium bisulfite, sodium bicarbonate, tartaric acid, fructose, dextrose, sorbose, inositol, Rongalite, and ascorbic acid. Preferred are combinations of one or more peroxides selected from hydrogen peroxide, potassium persulfate, sodium persulfate, and ammonium persulfate, and one or more reducing agents selected from sodium bisulfite, sodium bicarbonate, tartaric acid, Rongalite, and ascorbic acid. More preferred are combinations of hydrogen peroxide and one or more reducing agents selected from sodium bisulfite, sodium bicarbonate, tartaric acid, Rongalite, and ascorbic acid. The polymerization initiator may be a water-soluble polymerization initiator such as potassium persulfate, ammonium persulfate, hydrogen peroxide, and cumene hydroperoxide combined with any of the foregoing polymerization initiators. These polymerization initiators may be used alone, or two or more thereof may be used in combination.

Optionally, a degree of polymerization regulator may be used in the polymerization step. The degree of polymerization regulator is preferably an aldehyde. Examples of the aldehyde include acetaldehyde, propyl aldehyde, butyl aldehyde, isobutyl aldehyde, pentyl aldehyde, hexyl aldehyde, heptyl aldehyde, and octyl aldehyde. From the viewpoints of the water solubility of the modified PVA(A) produced, and the polymerization stability of when the modified PVA(A) is used as a dispersion stabilizer for suspension polymerization of vinyl compounds, the aldehyde is preferably an aldehyde having 2 to 4 carbon atoms, more preferably acetaldehyde, propyl aldehyde, or butyl aldehyde. For availability, acetaldehyde is even more preferred. The degree of polymerization regulator is used in an amount of preferably 0.5 mass % to 10 mass %, more preferably 1 mass % to 5 mass % relative to the vinyl ester monomer.

The polymerization conversion rate of the vinyl ester monomer in the polymerization step is not particularly limited, and is preferably 20% or more and less than 90%, more preferably 25% or more and less than 80%, even more preferably 30% or more and less than 60%. A polymerization conversion rate of less than 20% results in poor productivity. A polymerization conversion rate of 90% or more tends to impair the hue of the modified PVA(A), or lower the performance of modified PVA(A) when it is used as a dispersion stabilizer for suspension polymerization of vinyl compounds.

The method for saponifying the vinyl ester polymer obtained in the polymerization step is not particularly limited, and the saponification may be achieved by using a known saponification method. Examples of such methods include alcoholysis reaction or hydrolysis reaction using a basic catalyst such as sodium hydroxide, potassium hydroxide, or sodium methoxide, or an acid catalyst such as p-toluenesulfonic acid. Examples of the solvent that can be used for such reactions include alcohols such as methanol and ethanol; esters such as methyl acetate and ethyl acetate; ketones such as acetone and methyl ethyl ketone; and aromatic hydrocarbons such as benzene and toluene. These solvents may be used alone, or two or more thereof may be used in combination. For convenience, it is preferable to carry out the saponification by using methanol or a mixed solution of methanol and methyl acetate as solvent, and sodium hydroxide as catalyst.

A modified PVA(A) having a side chain introduced with a double bond derived from an esterification agent, and having specific ranges of peak widths $W_{0.05h}$ at a height of 5% from the baseline in a peak measured by HPLC can be obtained through the heat-treatment and modification step in which the PVA(B) obtained in the saponification step is modified in a heat treatment in the presence of a specific solvent and a specific esterification agent. Examples of the esterification agent include itaconic acid and/or derivatives thereof, and methacrylic acid and/or derivatives thereof. Specific examples include itaconic acid or salts thereof, itaconic anhydride, itaconic acid monoalkyl ester, itaconic acid dialkyl ester, methacrylic acid or salts thereof, methacrylic anhydride, and methacrylic acid monoalkyl ester. The esterification agent may be used alone, or two or more thereof may be used in combination. In view of reactivity to PVA(B), preferred are itaconic acid, itaconic anhydride, methacrylic acid, and methacrylic anhydride. The esterification agent is used in an amount of preferably 0.2 parts by mass to 10 parts by mass, more preferably 0.5 parts by mass to 6 parts by mass relative to 100 parts by mass of PVA(B).

In view of accelerating the reaction between PVA(B) and the esterification agent, the heat treatment temperature is typically 50° C. to 200° C., preferably 70 to 180° C., more preferably 80 to 160° C. The reaction time is typically 10 minutes to 24 hours.

Preferably, PVA(B) has a powder form because it makes it easier to adjust the $W_{0.05h}$ value within the foregoing ranges. Preferably, the heat-treatment and modification step is carried out in the presence of a specific solvent because it makes it easier to adjust the $W_{0.05h}$ value within the foregoing ranges. Examples of the solvent include acetone, methanol, and methyl acetate. These may be used alone, or two or more thereof may be used in combination. The solvent is preferably one or more selected from the group consisting of methanol and methyl acetate in view of further reducing the water-insoluble content immediately after production and after long storage, and producing a vinyl polymer having a higher bulk specific gravity and even superior plasticizer absorbability with even less formation of coarse particles when the modified PVA(A) is used as a dispersion stabilizer for suspension polymerization of vinyl compounds, in addition to further reducing fisheyes in a molded product of the vinyl polymer. In view of great reduction of the water-insoluble content immediately after production and after long storage, the solvent is more preferably a mixed solvent of methanol and methyl acetate. Moderate plasticization of PVA(B) with methanol and methyl acetate particularly contributes to adjustments of $W_{0.05h}$ value.

The amount of solvent used in the heat-treatment and modification step is not particularly limited, and is preferably 1 part by mass or more and less than 100 parts by mass, more preferably 3 parts by mass or more and less than 70 parts by mass, even more preferably 5 parts by mass or more and less than 50 parts by mass, particularly preferably 5 parts by mass or more and less than 30 parts by mass relative to 100 parts by mass of PVA(B). A solvent content of less than 1 part by mass relative to 100 parts by mass of PVA(B) may cause the reaction to occur in a localized fashion, and the resulting modification unevenness may increase the $W_{0.05h}$ value or the water-insoluble content. A solvent content of 100 parts by mass or more may cause PVA(B) to fuse during the heat treatment. This may result in non-uniform transfer of heat, and the resulting modification unevenness may increase the $W_{0.05h}$ value or the water-insoluble content.

The modified PVA(A) has reduced the water-insoluble content in the form of an aqueous solution because the modification unevenness represented by $W_{0.05h}$ is confined within the specific range, despite having a side chain with an ethylenic double bond derived from the specific esterification agent. Specifically, the modified PVA(A) has a water-insoluble content (ppm) of preferably 2,000 ppm or less, more preferably 1,000 ppm or less, even more preferably 500 ppm or less. Preferably, the water-insoluble content (ppm) of modified PVA(A) should be reduced as much as possible, and may be 0 ppm or more, or more than 0 ppm. The water-insoluble content measurement method is as described in the Examples below.

Uses

A modified PVA(A) of the present invention has various uses. The following are non-limiting examples of possible uses.

(1) Dispersants: dispersion stabilizers for pigments contained in materials such as coating materials and adhesives; dispersion stabilizers and dispersion aids for suspension polymerization of various vinyl compounds such as vinyl chloride, vinylidene chloride, styrene, (meth)acrylate, and vinyl acetate (2) Coating agents: paper coating agents, sizing agents, textile processing agents, leather finishing agents, coating materials, anti-fogging agents, metal corrosion inhibitors, gloss agents for zinc plating, antistatic agents, and medical coating agents (3) Adhesives: adhesives, pressure sensitive adhesives, rewetting adhesives, various binders, and additives for cements and mortars (4) Emulsifiers: emulsifiers for emulsion polymerization, and post-emulsifiers for substances such as bitumen (5) Flocculants: flocculants for suspended and dissolved matter in water, and metal flocculants (6) Paper processing: paper strength enhancers, oil- and solvent-resistance imparting agents, smoothness improving agents, auxiliary agents for surface gloss improvement, sealing agents, barrier agents, lightfastness imparting agents, waterproofing agents, dispersants for dyes and color-developing agents, adhesion improving agents, and binders (7) Agriculture: agrichemical binders, agrichemical spreading agents, agricultural coating agents, soil improvers, erosion preventing agents, and agrichemical dispersants (8) Medicine and cosmetics: granulating binders, coating agents, emulsifiers, patches, binders, film formulation bases, and film-forming agents (9) Viscosity adjustments: thickeners, and rheology adjusters

(10) Films: water-soluble films, polarizing films, barrier films, textiles wrapping films, seedling protecting sheets, vegetation sheets, seed tapes, and hygroscopic films

(11) Molded products: fibers, pipes, tubes, leak-proof films, water-soluble fibers for chemical laces, and sponges

(12) Gels: medical gels, industrial gels

(13) Post-reactions: post-reactions with low-molecular organic compounds, high-molecular organic compounds, and inorganic compounds A modified PVA(A) of the present invention is particularly preferred for use in dispersant applications, as described below.

Dispersion Stabilizer for Suspension Polymerization of Vinyl Compounds

A modified PVA(A) of the present invention is preferred for use as a dispersion stabilizer for suspension polymerization of vinyl compounds. Despite having a side chain with an ethylenic double bond derived from itaconic acid or methacrylic acid, a modified PVA(A) of the present invention has reduced the water-insoluble content immediately after production and after long storage, and has modification unevenness confined within the specific range. Because of these properties, a modified PVA(A) of the present invention stabilizes the polymerization reaction when used as a dispersion stabilizer for suspension polymerization of vinyl compounds, and enables production of a vinyl polymer having a higher bulk specific gravity and even superior plasticizer absorbability with even less formation of coarse particles, and further reduction of fisheyes in a molded product made from the vinyl polymer. A dispersion stabilizer for suspension polymerization of vinyl compounds of the present invention comprises the modified PVA(A). Preferably, a dispersion stabilizer for suspension polymerization of vinyl compounds of the present invention is consisting of the modified PVA(A).

The dispersion stabilizer for suspension polymerization may comprise various additives, provided that such addition is not against the intent and purpose of the present invention. Examples of the additives include degree of polymerization regulators such as aldehydes, halogenated hydrocarbons, and mercaptans; polymerization inhibitors such as phenol compounds, sulfur compounds, and N-oxide compounds; pH adjusters; cross-linking agents; preservatives; mildewcides; antiblocking agents; antifoaming agents; and compatibilizing agents. The additive content in the dispersion stabilizer for suspension polymerization is preferably 10 mass % or less, more preferably 5 mass % or less relative to the whole dispersion stabilizer for suspension polymerization.

Vinyl Polymer Producing Method

Another preferred embodiment of the present invention is a method for producing a vinyl polymer comprising subjecting a vinyl compound to suspension polymerization in the presence of a modified PVA(A)-containing dispersion stabilizer for suspension polymerization of the present invention. The method produces a particulate vinyl polymer.

The modified PVA(A)-containing dispersion stabilizer for suspension polymerization of the present invention can be charged into an polymerization vessel by using, for example, (i) a method that charges the dispersion stabilizer into a polymerization vessel in the form of an aqueous solution, or (ii) a method that charges the dispersion stabilizer in an as-produced powder form. The method (i) is more preferred in terms of homogenization in the polymerization vessel.

Examples of the vinyl compounds include vinyl halides such as vinyl chloride; vinyl esters such as vinyl acetate and vinyl propionate; acrylic acid, methacrylic acid, and esters and salts thereof, maleic acid, fumaric acid, and esters and anhydrides thereof; styrene, acrylonitrile, vinylidene chloride, and vinyl ether. Preferred is vinyl chloride, alone or with a monomer capable of copolymerizing with vinyl chloride. Examples of the monomer capable of copolymerizing with vinyl chloride include vinyl esters such as vinyl acetate and vinyl propionate; (meth)acrylic acid esters such as methyl (meth)acrylate and ethyl (meth)acrylate; α-olefins such as ethylene and propylene; unsaturated dicarboxylic acids such as maleic anhydride and itaconic acid; and acrylonitrile, styrene, vinylidene chloride, and vinyl ether.

For suspension polymerization of a vinyl compound, an oil-soluble or water-soluble polymerization initiator, which is conventionally used for polymerization of vinyl chloride, can be used. Examples of the oil-soluble polymerization initiator include:

peroxydicarbonate compounds such as diisopropyl peroxydicarbonate, di(2-ethylhexyl)peroxydicarbonate, and diethoxyethyl peroxydicarbonate;

perester compounds such as t-butyl peroxyneodecanoate, t-butyl peroxypivalate, t-hexyl peroxypivalate, and cumyl peroxyneodecanoate;

peroxides such as acetyl(cyclohexylsulfonyl)peroxide, 2,4,4-trimethylpentyl-2-peroxyphenoxyacetate, 3,5,5-trimethylhexanoylperoxide, and lauroyl peroxide; and azo polymerization initiators such as 2,2'-azobis(2,4-dimethylvaleronitrile), 2,2'-azobis(isobutyronitrile), and 2,2'-azobis(4-methoxy-2,4-dimethylvaleronitrile).

Examples of the water-soluble polymerization initiator include potassium persulfate, ammonium persulfate, hydrogen peroxide, and cumene hydroperoxide. These polymerization initiators may be used alone, or two or more thereof may be used in combination.

In suspension polymerization of a vinyl compound, the polymerization temperature is not particularly limited, and may be a low temperature of about 20° C., or a high temperature of more than 90° C. Preferably, the polymerization temperature is about 20 to 60° C. A polymerizer equipped with a reflux condenser may be used in order to increase the heat removal efficiency of the polymerization reaction system.

The vinyl polymer obtained can be used for formation of various molded products by adding additives such as plasticizers (e.g., phthalic acid esters such as dioctylphthalate; phosphoric acid esters, adipic acid esters, trimellitic acid esters, and citric acid esters), as needed.

In suspension polymerization of a vinyl compound, the amount (concentration) of the dispersion stabilizer for suspension polymerization of the present invention may be 1,000 ppm or less, 800 ppm or less, 600 ppm or less, or 400 ppm or less relative to the vinyl compound. Here, ppm means ppm by mass.

For suspension polymerization of a vinyl compound, the modified PVA(A) may be used with materials commonly used for suspension polymerization of a vinyl compound in an aqueous vehicle. Examples of such materials include:

water-soluble cellulose ethers such as methyl cellulose, hydroxyethyl cellulose, hydroxypropyl cellulose, and hydroxypropyl methyl cellulose;

water-soluble polymers such as gelatin;

oil-soluble emulsifiers such as sorbitan monolaurate, sorbitan trioleate, glycerin tristearate, and an ethylene oxide-propylene oxide block copolymer; and water-soluble emulsifiers such as polyoxyethylene sorbitan monolaurate, polyoxyethylene glyceryl oleate, and sodium laurate.

The amount of these materials is not particularly limited, and is preferably 0.01 parts by mass to 1.0 part by mass per 100 parts by mass of the vinyl compound.

EXAMPLES

The following describes the present invention in greater detail by way of Examples. In the following Examples and Comparative Examples, "part(s)" and "%" are by mass, and "ppm" means ppm by mass, unless otherwise specifically stated.

Viscosity-Average Degrees of Polymerization of Modified PVA(A) and PVA(B)

The viscosity-average degrees of polymerization of modified PVA(A) and PVA(B) were measured according to JIS K 6726:1994. Specifically, when PVA had a degree of saponification of less than 99.5 mol %, the PVA was saponified until the degree of saponification reached at least 99.5 mol %, and the viscosity-average degree of polymerization (P)

was measured from the limiting viscosity [η] (L/g) measured in water at 30° C., using the following formula.

$$P=([\eta]\times10^4/8.29)^{(1/0.62)}$$

Degrees of Saponification of Modified PVA(A) and PVA(B)

The degrees of saponification of modified PVA(A) and PVA(B) were measured according to JIS K 6726:1994.

Content of Modifying Group in the Side Chain of Modified PVA(A)

The content of the modifying group in the side chain of modified PVA(A) was measured and calculated as follows. First, a 10 mass % aqueous solution of modified PVA(A) was prepared. Five grams of the aqueous solution was then dropped on 500 g of a 95:5 solution of methyl acetate and water to precipitate modified PVA(A). The modified PVA(A) was collected, dried, and isolated, and dissolved in DMSO-$d_6$ for $^1$H-NMR measurement at 400 MHz. The $^1$H-NMR spectrum had a peak derived from the methine of the vinyl alcohol unit near 3.2 to 4.0 ppm (integral value [P]), and a number of peaks attributed to the protons derived from the modifying group in the side chain near 5.0 to 6.5 ppm (any of the peaks is usable; integral value [Q]). The content of the modifying group in the side chain was determined from these peaks using the following formula.

Content of modifying group in the side chain (mol %)=[Q]/[P]×100

Water-insoluble Content (a) in Modified PVA(A) Aqueous Solution

After production, the modified PVA(A) was left to stand in air at 60° C. for 1 hour, and 100 g of a 4 mass % aqueous solution of modified PVA(A) was prepared. The total amount was filtered through a 200-mesh metal sieve (equivalent to a JIS standard sieve mesh size of 75 the mesh size is in compliance with the nominal opening W of JIS Z 8801-1-2006), and the trapped material was dried at 105° C. for 3 hours, together with the sieve (the mass of the metal sieve before filtration is a (g), and the total absolute dry mass of the sieve and the remaining substance on the sieve is b (g)). The water-insoluble content (ppm) was determined using the following formula.

Water-insoluble content (ppm)=1,000,000×(b−a)/4

Water-insoluble Content (b) in Modified PVA(A) Aqueous Solution

After production, the modified PVA(A) was left to stand in air at 60° C. for 6 months, and 100 g of a 4 mass % aqueous solution of modified PVA(A) was prepared. The total amount was filtered through a 200-mesh metal sieve (equivalent to a JIS standard sieve mesh size of 75 μm; the mesh size is in compliance with the nominal opening W of JIS Z 8801-1-2006), and the trapped material was dried at 105° C. for 3 hours, together with the sieve (the mass of the metal sieve before filtration is a (g), and the total absolute dry mass of the sieve and the remaining substance on the sieve is b (g)). The water-insoluble content (ppm) was determined using the following formula.

Water-insoluble content (ppm)=1,000,000×(b−a)/4

Measurement of $W_{0.05h}$ of Modified PVA(A) by HPLC

In the present invention, the modified PVA(A) was measured for $W_{0.05h}$ in the manner described below.

Preparation of Specimen Solution:

For preparation, 5 mL of water was precisely added to 25 mg of a specimen charged in a pressure tight test tube (O=18 mm, length=18 cm), and the solution was stirred with an aluminum block magnetic stirrer after placing a cap. Here, the modified PVA(A) was stirred and dissolved at 20° C. for 1 hour when it had a degree of saponification of less than 80 mol %, and at 90° C. for 2 hours when it had a degree of saponification of 80 mol % or more.

HPLC Measurement Conditions
Specimen concentration: 5 mg/mL
Specimen Solvent: Water
Injection volume: 30 μL
Detector: Evaporative light scattering detector ELSD-LTII (manufactured by Shimadzu Corporation)
Column temperature: 45° C.
Mobile phase A: Ion-exchange water; B: Ethanol (99.5%)
Flow rate of mobile phase: 0.4 mL/min
Column: Shimpack G-ODS(4), 4 mm in inner diameter×1 cm in length, particle diameter: 5 μm, manufactured by Shimadzu Corporation
Gradient Conditions:

In a HPLC system using ion-exchange water and ethanol as mobile phase A and mobile phase B, respectively, the column before injection of specimen solution is filled with a 95:5 mixed solvent of mobile phase A and mobile phase B by volume. The specimen solution is injected under this condition. A 95:5 mixture of mobile phase A and mobile phase B by volume was passed for 5 minutes immediately after the injection of specimen solution, and the proportion of mobile phase B in the mobile phase was increased at a constant rate over the period of next 20 minutes so as to make the proportion of mobile phase B 100% after 25 minutes from the injection of the specimen solution.

Example 1

Production of PVA(A1)

In a 1 L eggplant flask, methanol (5 parts), methyl acetate (15 parts), and itaconic acid (esterification agent, 4 parts) were added to 100 parts of a powder PVA(B) having a viscosity-average degree of polymerization of 800 and a degree of saponification of 72 mol %. After thorough shaking, the mixture was subjected to a heat treatment at 110° C. for 4 hours. This produced a modified PVA(A1) having a viscosity-average degree of polymerization of 800 and a degree of saponification of 72 mol %, containing 0.10 mol % of a double bond derived from itaconic acid, and having a $W_{0.05h}$ value of 3.20 minutes. The modified PVA (A1) had a water-insoluble content (a) of 200 ppm, and a water-insoluble content (b) of 450 ppm.

Examples 2 to 8 and Comparative Examples 1 to 4

Production of PVA(A2) to PVA(A12)

PVA(A2) to PVA(A12) were produced in the same manner as in Example 1, except that the viscosity-average degree of polymerization and the degree of saponification of PVA(B), the type and amount of solvent, the type and amount of esterification agent, and the heat treatment temperature were varied as shown in Table 1. Table 1 shows the production conditions. Table 2 shows the results of the measurement of water-insoluble content.

Comparative Example 5

Production of PVA(A13)

PVA(A13) was produced in the same manner as in Example 1, except that the solvent was not used for the heat treatment. Table 1 shows the production conditions. Table 2 shows the results of the measurement of water-insoluble content.

Comparative Example 6

Production of PVA(A14)

A PVA(B) having a viscosity-average degree of polymerization of 700 and a degree of saponification of 70 mol % was swelled by adding 100 parts of PVA(B) to a solution dissolving 1 part of itaconic acid and 200 parts of methanol. The PVA(B) was then dried at 40° C. for 24 hours under reduced pressure. After a heat treatment performed at 120° C. for 4 hours in a nitrogen atmosphere, the product was washed with tetrahydrofuran using the Soxhlet method to yield a PVA(A14). Table 1 shows the production conditions. Table 2 shows the results of the measurement of water-insoluble content.

In Comparative Example 1, the degree of saponification was too low, and the water-insoluble contents (a) and (b) exceeded 100,000 ppm, resulting in very poor water solubility. In Comparative Example 2, the viscosity-average degree of polymerization was too high, and the water-insoluble contents (a) and (b) exceeded 100,000 ppm, resulting in very poor water solubility. In Comparative Example 3, the use of hexane as solvent in the heat treatment resulted in an overly large $W_{0.05h}$ value, and the water-insoluble contents (a) and (b) were high, making the water solubility poor. Particularly, the high water-insoluble content (b) resulted in poor storage stability of an aqueous solution. In Comparative Example 4, the use of butanol and butyl acetate as solvent in the heat treatment resulted in an overly large $W_{0.05h}$ value, and the water-insoluble contents (a) and (b) were high, making the water solubility poor. Particularly, the high water-insoluble content (b) resulted in poor storage stability of an aqueous solution. In Comparative Example 5, the lack of solvent in the heat treatment resulted in an overly large $W_{0.05h}$ value, and the water-insoluble contents (a) and (b) were high, making the water solubility poor. Particularly, the high water-insoluble content (b) resulted in poor storage stability of an aqueous solution. In Comparative Example 6, the use of a large quantity of methanol as solvent produced modification unevenness after the modification in the heat treatment, and the $W_{0.05h}$ value was too high, resulting in high water-insoluble contents (a) and (b), and poor water solubility.

TABLE 1

Synthesis of modified PVA(A)

| | | PVA(B) | | Solvent | | Esterification agent | | Heat treatment conditions | |
|---|---|---|---|---|---|---|---|---|---|
| | | Viscosity-average degree of polymerization | Degree of saponification (mol %) | Type | Amount used (parts)[1] | Type | Amount used (parts)[1] | Temp. (C) | Time (hr) |
| Ex. 1 | PVA(A1) | 800 | 72 | Methanol/methyl acetate | 5/15 | Itaconic acid | 4 | 110 | 4 |
| Ex. 2 | PVA(A2) | 1700 | 88 | Methanol/methyl acetate | 10/10 | Itaconic acid | 4 | 110 | 4 |
| Ex. 3 | PVA(A3) | 2400 | 96 | Methanol/methyl acetate | 15/5 | Itaconic acid | 4 | 110 | 4 |
| Ex. 4 | PVA(A4) | 800 | 72 | Methanol/methyl acetate | 1/15 | Methacrylic anhydride | 5 | 100 | 4 |
| Ex. 5 | PVA(A5) | 500 | 88 | Methanol/methyl acetate | 2/10 | Methacrylic anhydride | 3 | 110 | 4 |
| Ex. 6 | PVA(A6) | 2400 | 96 | Methyl acetate | 10 | Itaconic acid | 4 | 110 | 4 |
| Ex. 7 | PVA(A7) | 2400 | 96 | Methanol | 10 | Itaconic acid | 4 | 110 | 4 |
| Ex. 8 | PVA(A8) | 1700 | 88 | Acetone | 20 | Itaconic acid | 4 | 110 | 4 |
| Com. Ex. 1 | PVA(A9) | 2000 | 65 | Methanol/methyl acetate | 5/15 | Itaconic acid | 4 | 110 | 4 |
| Com. Ex. 2 | PVA(A10) | 3500 | 99 | Methanol/methyl acetate | 5/15 | Itaconic acid | 4 | 110 | 4 |
| Com. Ex. 3 | PVA(A11) | 800 | 72 | Hexane | 20 | Methacrylic anhydride | 5 | 100 | 4 |
| Com. Ex. 4 | PVA(A12) | 1700 | 88 | Butanol/butyl acetate | 10/10 | Itaconic acid | 4 | 110 | 4 |
| Com. Ex. 5 | PVA(A13) | 800 | 72 | Itaconic acid | — | — | 4 | 110 | 4 |
| Com. Ex. 6 | PVA(A14) | 700 | 70 | Methanol | 200 | Itaconic acid | 1 | 120 | 4 |

Synthesis of modified PVA(A)
Evaluation results for modified PVA(A)

| | | Viscosity-average degree of polymerization | Degree of saponification (mol %) | Modifying group introduced | Amount of introduced modifying group (mol %) | $W_{0.05h}$ (min) |
|---|---|---|---|---|---|---|
| Ex. 1 | PVA(A1) | 800 | 72 | Itaconyl group | 0.10 | 3.20 |
| Ex. 2 | PVA(A2) | 1700 | 88 | Itaconyl group | 0.11 | 3.22 |
| Ex. 3 | PVA(A3) | 2400 | 96 | Itaconyl group | 0.11 | 3.24 |
| Ex. 4 | PVA(A4) | 800 | 72 | Methacryloyl group | 0.34 | 3.30 |
| Ex. 5 | PVA(A5) | 500 | 88 | Methacryloyl group | 0.12 | 3.14 |
| Ex. 6 | PVA(A6) | 2400 | 96 | Itaconyl group | 0.11 | 3.42 |
| Ex. 7 | PVA(A7) | 2400 | 96 | Itaconyl group | 0.11 | 3.50 |
| Ex. 8 | PVA(A8) | 1700 | 88 | Itaconyl group | 0.11 | 3.55 |
| Com. Ex. 1 | PVA(A9) | 2000 | 65 | Itaconyl group | 0.10 | 3.25 |
| Com. Ex. 2 | PVA(A10) | 3500 | 99 | Itaconyl group | 0.10 | 3.32 |
| Com. Ex. 3 | PVA(A11) | 800 | 72 | Methacryloyl group | 0.39 | 3.80 |
| Com. Ex. 4 | PVA(A12) | 1700 | 88 | Itaconyl group | 0.11 | 3.83 |
| Com. Ex. 5 | PVA(A13) | 800 | 72 | Itaconyl group | 0.10 | 4.05 |
| Com. Ex. 6 | PVA(A14) | 700 | 70 | Itaconyl group | 0.20 | 3.95 |

[1]Amount relative to 100 parts of PVA(B) (parts)

TABLE 2

| | | Water-insoluble content (a) (ppm/modified PVA(A)) | Water-Insoluble content (b) (ppm/modified PVA(A)) |
|---|---|---|---|
| Ex. 1 | PVA(A1) | 200 | 450 |
| Ex. 2 | PVA(A2) | 180 | 400 |
| Ex. 3 | PVA(A3) | 150 | 500 |
| Ex. 4 | PVA(A4) | 320 | 800 |
| Ex. 5 | PVA(A5) | 20 | 70 |
| Ex. 6 | PVA(A6) | 1800 | 7000 |
| Ex. 7 | PVA(A7) | 1020 | 5080 |
| Ex. 8 | PVA(A8) | 1700 | 6500 |
| Com. Ex. 1 | PVA(A9) | >100000 | >100000 |
| Com. Ex. 2 | PVA(A10) | >100000 | >100000 |
| Com. Ex. 3 | PVA(A11) | 9000 | 86000 |
| Com. Ex. 4 | PVA(A12) | 10000 | 90000 |
| Com. Ex. 5 | PVA(A13) | 19000 | >100000 |
| Com. Ex. 6 | PVA(A14) | 30000 | >100000 |

Water-insoluble content (a): Content of water-insoluble in an aqueous solution prepared after 1 hour at 60° C. from production
Water-insoluble content (b): Content of water-insoluble in an aqueous solution prepared after 6 months at 60° C. from production

Example 9

As an example of modified PVA(A), PVA(A4) was used as a dispersion stabilizer for suspension polymerization, and dissolved in deionized water. One-hundred parts of the PVA(A4) aqueous solution was then charged into an autoclave. Here, PVA(A4) was charged in an amount that makes the PVA(A4) concentration 450 ppm with respect to the amount of the vinyl chloride charged. Thereafter, deionized water was added to make the total fraction of deionized water 1,200 parts. This was followed by addition of 0.65 parts of a 70% toluene solution of cumyl peroxyneodecanoate, and 1.05 parts of a 70% toluene solution of t-butyl peroxyneodecanoate into an autoclave, and nitrogen was introduced into the autoclave until the pressure reached 0.2 MPa. Nitrogen purging was conducted a total of five times to thoroughly replace inside of the autoclave with nitrogen and remove oxygen. After this procedure, 940 parts of vinyl chloride was added. The contents inside the autoclave were then heated to 57° C. to initiate suspension polymerization of vinyl chloride, with stirring. The autoclave had an inner pressure of 0.80 MPa at the start of polymerization. After about 3.5 hours from the start of polymerization, the polymerization was ceased at the timing when the pressure inside the autoclave reached 0.70 MPa. The polymerization product was taken out after removing unreacted vinyl chloride. The product was then dried at 65° C. for 16 hours to obtain vinyl chloride polymer particles. The vinyl chloride polymer particles were evaluated in the manner described below. The vinyl chloride polymer produced by using PVA(A4) as a dispersion stabilizer for suspension polymerization had no coarse particles, and had desirable polymerization stability. The molded product obtained from the vinyl chloride polymer had reduced numbers of fisheyes.

Evaluation of Vinyl Chloride Polymer Particles

The vinyl chloride polymer particles were evaluated for (1) average particle diameter, (2) particle size distribution, (3) fisheyes, (4) bulk specific gravity, and (5) plasticizer absorbability, using the following methods. The evaluation results are presented in Table 3.

(1) Average Particle Diameter

The particle size distribution was measured according to the dry sieving method described in JIS Z 8815:1994, using a sieve that complied with Tyler Standard Sieve Series. The measurement results were plotted to create a Rosin-Rammler distribution, and the average particle diameter ($d_{p50}$) was calculated.

(2) Particle Size Distribution

The content of vinyl chloride polymer particles (mass %) that did not pass through a 355-µm mesh sieve (equivalent to a JIS standard 42-mesh sieve) was evaluated using the following criteria. Here, the content means the percentage of particles accumulating on the sieve. The sieve opening complies with the nominal opening W of JIS Z 8801-1-2006.

A: less than 0.5%
B: 0.5% or more and less than 1.0%
C: 1.0% or more

The content of vinyl chloride polymer particles (mass %) that passed through a 355-µm mesh sieve but did not pass through a 250-µm mesh sieve (equivalent to a JIS standard 60-mesh sieve) was evaluated using the following criteria. Here, the content means the percentage of particles accumulating on the sieve. The sieve opening complies with the nominal opening W of JIS Z 8801-1-2006.

A: less than 5%
B: 5% or more and less than 10%
C: 10% or more

With regard to the vinyl chloride polymer particles that did not pass through the 355-µm mesh sieve and the vinyl chloride polymer particles that did not pass through the 250-µm mesh sieve, smaller content values of these polymer particles mean higher polymerization stability with fewer coarse particles and a sharper particle size distribution.

(3) Fisheyes

The vinyl chloride polymer particles (100 parts), dioctylphthalate (50 parts), tribasic lead sulfate (5 parts), and zinc stearate (1 part) were roll kneaded at 150° C. for 7 minutes to produce a 0.1-mm thick sheet. The sheet was then measured for number of fisheyes per 1,000 cm$^2$ by visual inspection. Fewer fisheyes mean that the sheet is less defective.

(4) Bulk Specific Gravity

The bulk specific gravity of vinyl chloride polymer was measured following JIS K 6720-2:1999. The evaluation results are presented in Table 3.

(5) Plasticizer Absorbability

The mass (A (g)) of a 5-mL syringe filled with 0.02 g of absorbent cotton was measured, and 0.5 g of vinyl chloride polymer particles was added to the syringe and the combined mass (B (g)) was measured. After adding 1 g of dioctyl phthalate as plasticizer, the syringe was left to stand for 15 minutes, and centrifuged at 3,000 rpm for 40 minutes. The resulting mass (C (g)) was then measured. The plasticizer absorbability (%) was determined from the calculation formula below.

$$\text{Plasticizer absorbability } (\%)=100\times[\{(C-A)/(B-A)\}-1]$$

Comparative Examples 7 and 8

Suspension polymerization of vinyl chloride was conducted in the same manner as in Example 9, except that PVA(A11) or PVA(A13) was used instead of PVA(A4). The evaluation results for the vinyl chloride polymer particles produced are presented in Table 3. PVA(A11) or (A13) had an overly large $W_{0.05h}$ value, and the vinyl chloride polymer particles produced had a large average particle diameter with a large fraction of coarse particles. The polymerization stability was not satisfactory, and the fisheye count was high.

TABLE 3

| | | Amount relative to vinyl chloride monomer (ppm/VCM) | Average particle diameter (μm) | Evaluation results of vinyl chloride polymer particles | | | | |
|---|---|---|---|---|---|---|---|---|
| | | | | Particle size distribution | | Fisheye count | Bulk specific gravity (g/cc) | Plasticizer absorbability(%) |
| | | | | Particles on 42 mesh | Particles on 60 mesh | | | |
| Ex. 9 | PVA(A4) | 450 | 151.3 | A | A | 3 | 0.480 | 29.0 |
| Com. Ex. 7 | PVA(A11) | 450 | 189.9 | C | C | 1400 | 0.431 | 24.6 |
| Com. Ex. 8 | PVA(A13) | 450 | 203.4 | C | C | 2000 | 0.420 | 22.1 |

In the table, VCM stands for vinyl chloride monomer.

As demonstrated in Examples, the specific modified PVA (A) of the present invention has a reduced water-insoluble content, and superior storage stability in the form of an aqueous solution, despite having an ethylenic double bond. When used as a dispersion stabilizer for suspension polymerization of vinyl compounds, the modified PVA(A) of the present invention provides superior polymerization stability, and the vinyl polymer produced has a small average particle diameter with reduced formation of coarse particles, along with high bulk specific gravity and superior plasticizer absorbability. The vinyl polymer also enables production of a molded product with reduced numbers of fisheyes, offering desirable processability. This makes the present invention highly useful in industry.

The invention claimed is:

1. A modified vinyl alcohol polymer (A) having a degree of saponification of 68 mol % or more and less than 99.9 mol %, and a viscosity-average degree of polymerization of 200 or more and less than 3,000, and comprising a side chain with 0.01 mol % or more and less than 0.50 mol % of a double bond derived from an esterification agent, the esterification agent being one or more selected from the group consisting of (i) itaconic acid and/or derivatives thereof, and (ii) methacrylic acid and/or derivatives thereof, and the modified vinyl alcohol polymer (A) having a peak width W0.05h of at least 2.85 minutes and less than 3.70 minutes at a height of 5% from the baseline in a peak measured by high-performance liquid chromatography.

2. A method for producing the modified vinyl alcohol polymer (A) of claim 1, comprising a heat-treatment and modification step of modifying a vinyl alcohol polymer (B) having a degree of saponification of 68 mol % or more and less than 99.9 mol % and a viscosity-average degree of polymerization of 200 or more and less than 3,000 in a heat treatment in the presence of a solvent and an esterification agent, wherein the solvent is one or more selected from the group consisting of acetone, methanol, and methyl acetate, and the esterification agent is one or more selected from the group consisting of (i) itaconic acid and/or derivatives thereof, and (ii) methacrylic acid and/or derivatives thereof.

3. The method according to claim 2, wherein the solvent is one or more selected from the group consisting of methanol and methyl acetate.

4. The method according to claim 2, wherein the solvent is methanol and methyl acetate.

5. The method according to claim 2, wherein the solvent is used in an amount of 1 part by mass or more and less than 100 parts by mass relative to 100 parts by mass of the vinyl alcohol polymer (B).

6. A dispersion stabilizer for suspension polymerization of vinyl compounds, comprising the modified vinyl alcohol polymer (A) of claim 1.

7. A method for producing a vinyl polymer, comprising subjecting a vinyl compound to suspension polymerization in the presence of the dispersion stabilizer for suspension polymerization of claim 6.

* * * * *